(12) United States Patent
Ma et al.

(10) Patent No.: US 11,743,929 B2
(45) Date of Patent: Aug. 29, 2023

(54) METHOD TO MITIGATE TIMING RESOLUTION LIMITATION DUE TO SSB WITH SMALLER SCS

(71) Applicant: QUALCOMM Incorporated, San Diego, CA (US)

(72) Inventors: Jun Ma, San Diego, CA (US); Xiaoxia Zhang, San Diego, CA (US); Qiang Wu, San Diego, CA (US); Iyab Issam Sakhnini, San Diego, CA (US); Jing Sun, San Diego, CA (US); Mehmet Izzet Gurelli, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/230,713

(22) Filed: Apr. 14, 2021

(65) Prior Publication Data
US 2021/0345340 A1    Nov. 4, 2021

Related U.S. Application Data

(60) Provisional application No. 63/019,191, filed on May 1, 2020.

(51) Int. Cl.
| | |
|---|---|
| *H04W 4/00* | (2018.01) |
| *H04W 72/53* | (2023.01) |
| *H04L 27/26* | (2006.01) |
| *H04W 56/00* | (2009.01) |
| *H04W 72/0446* | (2023.01) |
| *H04W 72/23* | (2023.01) |

(52) U.S. Cl.
CPC ........ *H04W 72/53* (2023.01); *H04L 27/2607* (2013.01); *H04L 27/26025* (2021.01); *H04W 56/001* (2013.01); *H04W 72/0446* (2013.01); *H04W 72/23* (2023.01)

(58) Field of Classification Search
None
See application file for complete search history.

(56) References Cited

U.S. PATENT DOCUMENTS

| 2019/0141695 A1 | 5/2019 | Babaei et al. |
| 2019/0159226 A1 | 5/2019 | Ly et al. |

(Continued)

OTHER PUBLICATIONS

International Search Report and Written Opinion—PCT/US2021/027562—ISA/EPO—dated Jul. 26, 2021.

*Primary Examiner* — Zewdu A Beyen
(74) *Attorney, Agent, or Firm* — Patterson & Sheridan, L.L.P.

(57) ABSTRACT

Aspects of the present disclosure relate to wireless communications, and more particularly, to techniques for mitigating timing resolution limitations due to synchronization signal blocks (SSBs) with low subcarrier spacing (SCS). An example method by a user equipment (UE) generally includes detecting a SSB; determining a start time of a control resource set (CORESET) associated with the detected SSB, wherein the start time of the CORESET is aligned with a boundary of a symbol having a larger cyclic prefix (CP) than one or more other symbols in a same half-subframe; and monitoring the CORESET for a physical downlink control channel (PDCCH) transmission.

30 Claims, 12 Drawing Sheets

(56) References Cited

U.S. PATENT DOCUMENTS

2019/0305867 A1* 10/2019 Tseng .................. H04W 72/042
2019/0380149 A1    12/2019 Jiang et al.
2020/0053670 A1*  2/2020 Jung ................. H04W 56/0015

* cited by examiner

| SSB SCS (KHz) | 120 |
|---|---|
| SSB bandwidth (MHz) | 28.8 |
| Timing resolution (ns) | 34.7 |
| Notes | >CP of 3.84MHz SCS |

FIG. 6A

| Data SCS | 960 kHz | 1920 kHz | 3840 kHz |
|---|---|---|---|
| CP length (ns) | 73.2 | 36.6 | 18.3 |

FIG. 6B

| Symbols to evenly distribute excess CP over | CP duration (ns) with and without excess CO (approximated to the nearest 0.1 ns) |
|---|---|
| 1st of 448 symbols every half-subframe | (594.1, 73.2) ns |
| 1st and 2nd of 448 symbols every half-subframe | (333.7, 73.2) ns |
| 1st to 4th of 448 symbols every half-subframe | (203.4, 73.2) ns |

FIG. 7A

| Symbols to evenly distribute excess CP over | CP duration (ns) with and without excess CO (approximated to the nearest 0.1 ns) |
|---|---|
| 1st of 996 symbols every half-subframe | (557.4, 36.6) ns |
| 1st and 2nd of 996 symbols every half-subframe | (297.0, 36.6) ns |
| 1st to 4th of 996 symbols every half-subframe | (166.8, 36.6) ns |

FIG. 7B

| Symbols to evenly distribute excess CP over | CP duration (ns) with and without excess CO (approximated to the nearest 0.1 ns) |
|---|---|
| 1st of 1992 symbols every half-subframe | (539.1, 18.3) ns |
| 1st and 2nd of 1992 symbols every half-subframe | (278.7, 18.3) ns |
| 1st to 4th of 1992 symbols every half-subframe | (148.5, 18.3) ns |

FIG. 7C

METHOD TO MITIGATE TIMING RESOLUTION LIMITATION DUE TO SSB WITH SMALLER SCS

PRIORITY CLAIM(S)

This application claims benefit of and priority to U.S. Provisional Application No. 63/019,191, filed on May 1, 2020, which is expressly incorporated by reference in its entirety as if fully set forth below and for all applicable purposes.

TECHNICAL FIELD

Aspects of the present disclosure relate to wireless communications, and more particularly, to techniques for mitigating timing resolution limitations due to synchronization signal blocks (SSB) with smaller subcarrier spacing (SCS).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes detecting a synchronization signal block (SSB), determining a start time of a control resource set (CORESET) associated with the detected SSB, wherein the start time of the CORESET is aligned with a boundary of a symbol having a larger cyclic prefix (CP) than one or more other symbols in a same half-subframe, and monitoring the CORESET for a physical downlink control channel (PDCCH) transmission.

Certain aspects of the present disclosure are directed to an apparatus for wireless communication by a UE. The apparatus generally includes a memory and at least one processor coupled to the memory, the memory and the at least one processor being configured to detect a SSB; determine a start time of a CORESET associated with the detected SSB, wherein the start time of the CORESET is aligned with a boundary of a symbol having a larger CP than one or more other symbols in a same half-subframe; and monitor the CORESET for a PDCCH transmission.

Certain aspects of the present disclosure are directed to an apparatus for wireless communication by a UE. The apparatus generally includes means for detecting a SSB; means for determining a start time of a CORESET associated with the detected SSB, wherein the start time of the CORESET is aligned with a boundary of a symbol having a larger CP than one or more other symbols in a same half-subframe; and means for monitoring the CORESET for a PDCCH transmission.

Certain aspects of the present disclosure are directed to a computer readable medium having instructions stored thereon for detecting a SSB; determining a start time of a CORESET associated with the detected SSB, wherein the start time of the CORESET is aligned with a boundary of a symbol having a larger CP than one or more other symbols in a same half-subframe; and monitoring the CORESET for a PDCCH transmission.

Certain aspects of the present disclosure provide a method for wireless communications by a network entity. The method generally includes transmitting one or more SSBs, determining one or more start times for one or more CORESETs associated with the one or more SSBs, wherein the one or more start times of the one or more CORESETs are aligned with boundaries of orthogonal frequency division multiplexed (OFDM) symbols having larger CPs than one or more other OFDM symbols in a same half-subframe, and transmitting a PDCCH in one or more of the one or more CORESETs.

Certain aspects of the present disclosure are directed to an apparatus for wireless communication by a network entity. The apparatus generally includes a memory and at least one processor coupled to the memory, the memory and the at least one processor being configured to transmit one or more SSBs, determine one or more start times for one or more CORESETs associated with the one or more SSBs, wherein the one or more start times of the one or more CORESETs are aligned with boundaries of OFDM symbols having larger CPs than one or more other OFDM symbols in a same half-subframe, and transmit a PDCCH in one or more of the one or more CORESETs.

Certain aspects of the present disclosure are directed to an apparatus for wireless communication by a network entity. The apparatus generally includes means for transmitting one or more SSBs, means for determining one or more start times for one or more CORESETs associated with the one or more SSBs, wherein the one or more start times of the one or more CORESETs are aligned with boundaries of orthogonal frequency division multiplexed (OFDM) symbols having larger CPs than one or more other OFDM symbols in a same half-subframe, and means for transmitting a PDCCH in one or more of the one or more CORESETs.

Certain aspects of the present disclosure are directed to a computer readable medium having instructions stored thereon for transmitting one or more SSBs, determining one or more start times for one or more CORESETs associated with the one or more SSBs, wherein the one or more start times of the one or more CORESETs are aligned with boundaries of orthogonal frequency division multiplexed (OFDM) symbols having larger CPs than one or more other OFDM symbols in a same half-subframe, and transmitting a PDCCH in one or more of the one or more CORESETs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 6A-6B are tables with example timing and frequency information for a synchronization signal block (SSB).

FIGS. 7A-7C are tables with example timing information of symbols within a subframe, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
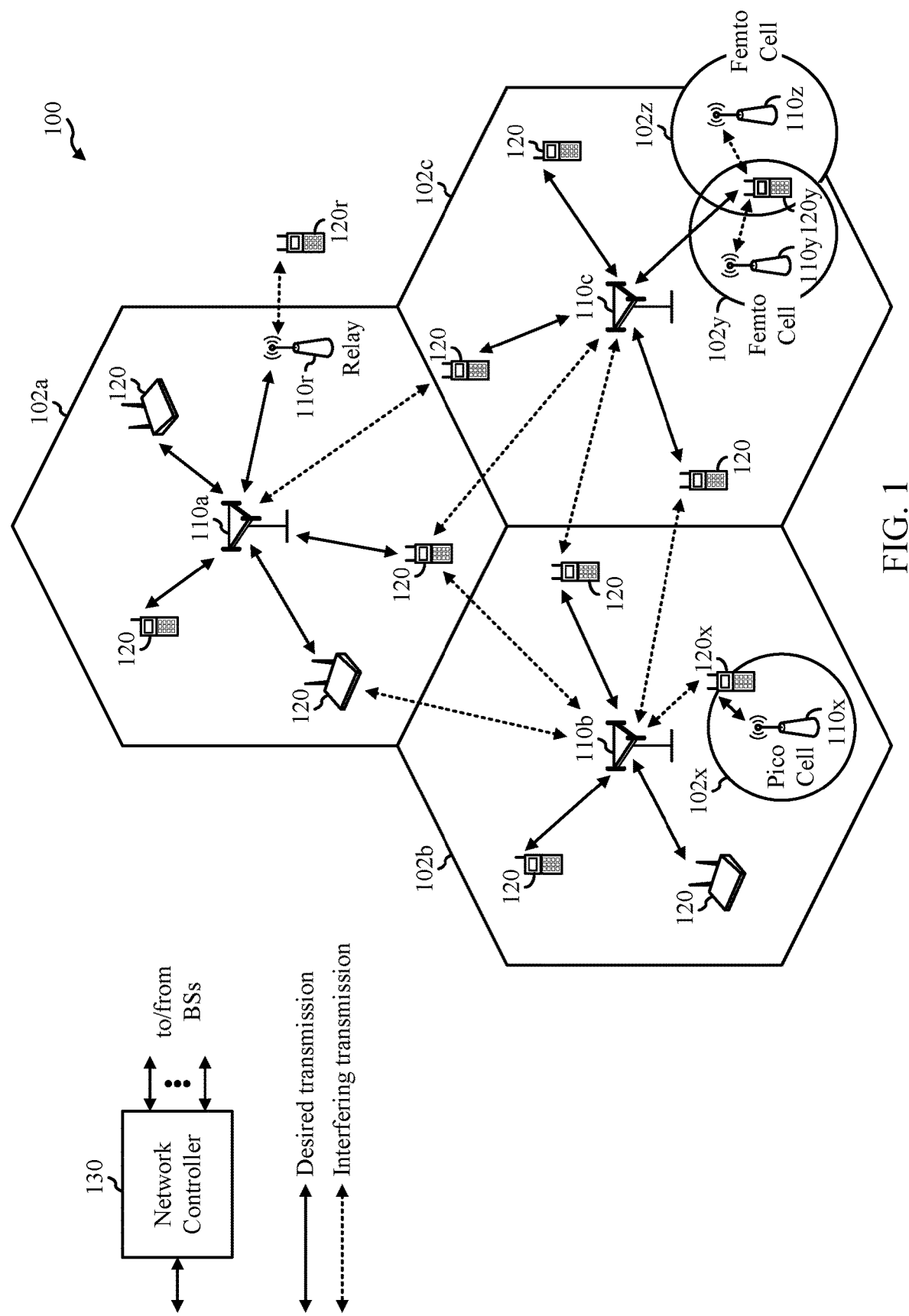
FIG. 1 is a block diagram conceptually illustrating an example telecommunications system, in accordance with certain aspects of the present disclosure.

Aspects of the present disclosure relate to wireless communications, and more particularly, to techniques for mitigating timing resolution limitation due to synchronization signal blocks (SSB) with smaller subcarrier spacing (SCS).

As will be described in greater detail below, the techniques may help align CORESETs with symbols that have larger cyclic prefixes (CP) durations, allowing a UE to refine timing adjustment after detecting an SSB.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a user equipment (UE) 120 configured to perform operations 800 of FIG. 8 to determine a start time of CORESET 0 after detecting an SSB. Similarly, the wireless network 100 may include a base station 110 configured to perform operations 900 of FIG. 9 to transmit SSBs and PDCCHs within CORESETs to a UE performing operations 800 of FIG. 8.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a NodeB (NB) and/or a NodeB subsystem serving this coverage area, depending on the context in which the term is used. In new radio (NR) systems, the term "cell" and next generation NodeB (gNB), NR base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
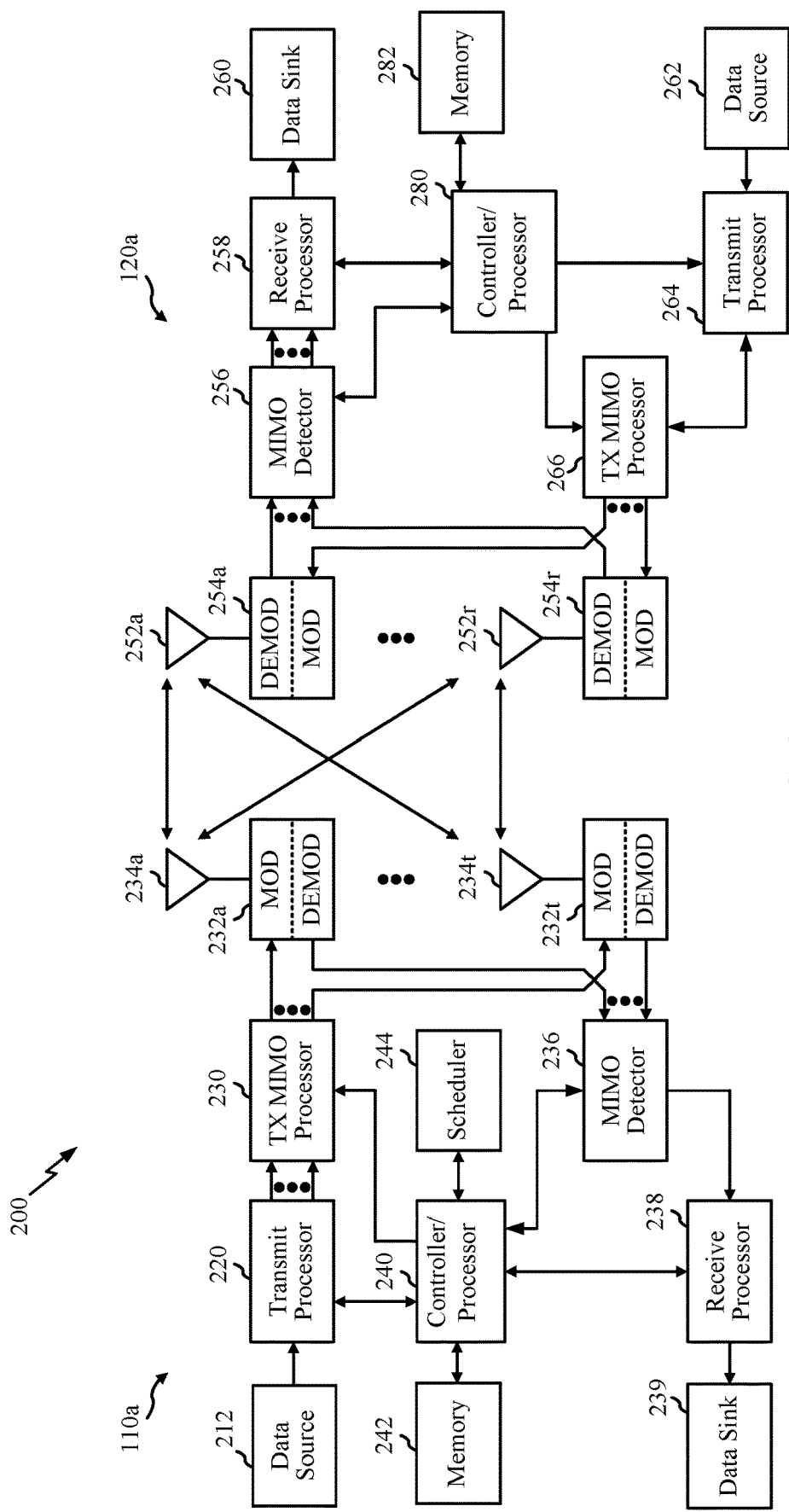
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, controller/processor 280 and/or other processors and modules at the UE 120a may perform (or be used by UE 120a to perform) operations 800 of FIG. 8. Similarly, the controller/processor 240 and/or other processors and modules at the BS 110a may perform or direct the execution of processes for the techniques described herein. For example, controller/processor 240 and/or other processors and modules at the BS 110a may perform (or be used by BS 110a to perform) operations 900 of FIG. 9. Although shown at the controller/processor, other components of the UE 120a or BS 110a may be used to perform the operations described herein.

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 3:
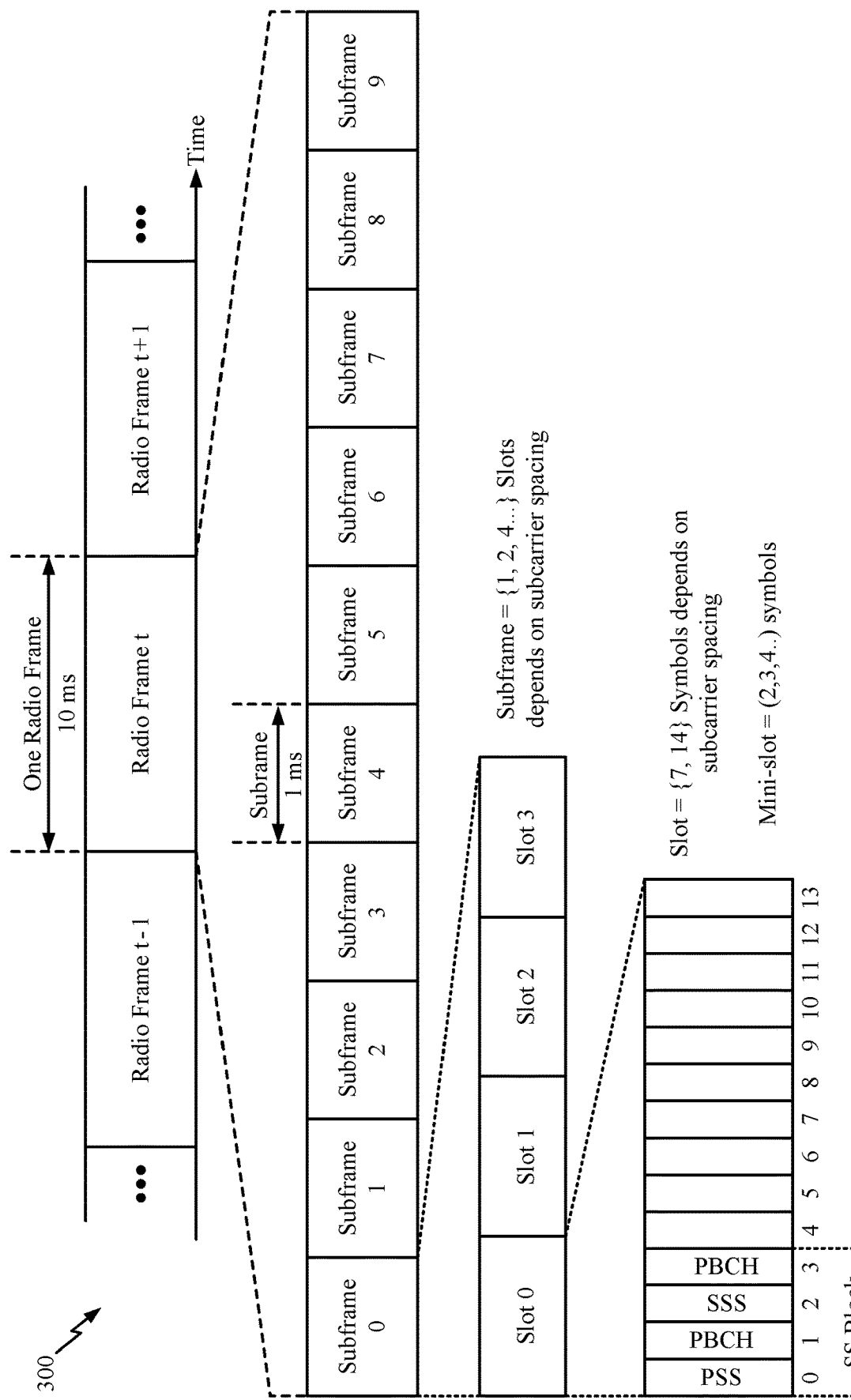
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The physical broadcast channel (PBCH) carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Figure 4:
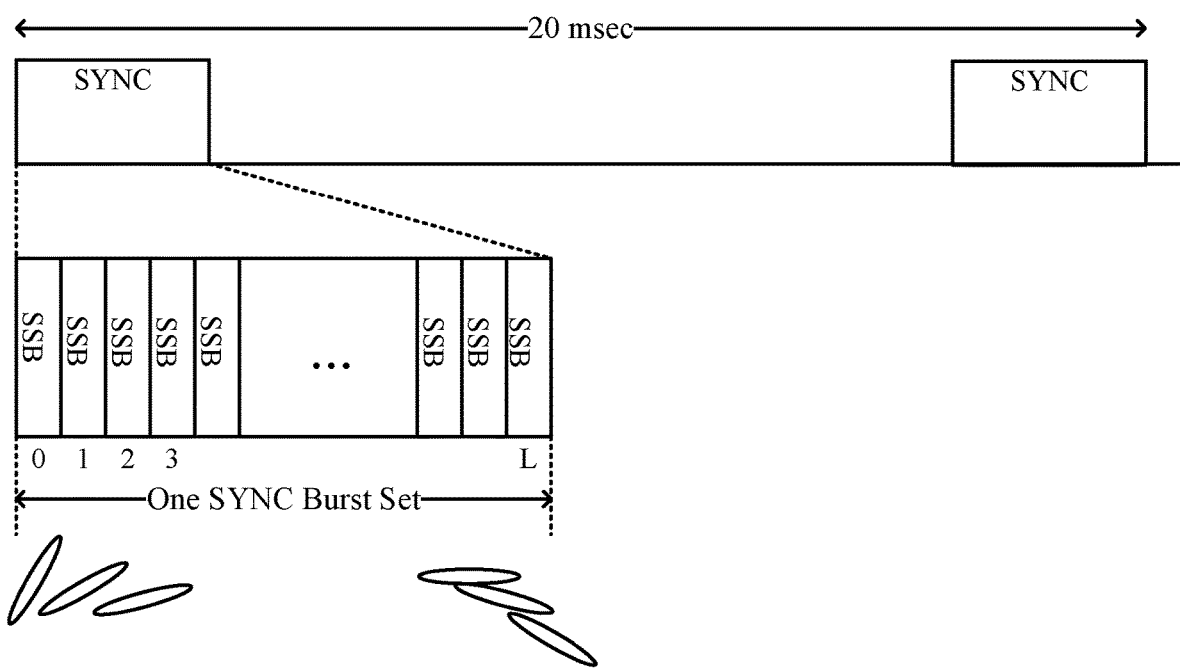
FIG. 4 illustrates how different synchronization signal blocks (SSBs) may be sent using different beams, in accordance with certain aspects of the present disclosure.

As shown in FIG. 4, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Control Resource Sets (CORESETs)

A control resource set (CORESET) for an orthogonal frequency division multiple access (OFDMA) system (e.g., a communications system transmitting physical downlink control channel (PDCCH) using OFDMA waveforms) may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given user equipment (UE). Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitors the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (e.g., UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0 or CORESET 0). This may be accomplished from one or more tables of CORESET configurations. These configurations (including single table scenarios) may include various subsets of indices indicating valid CORESET configurations for various combinations of minimum channel bandwidth and SCS. In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 5:
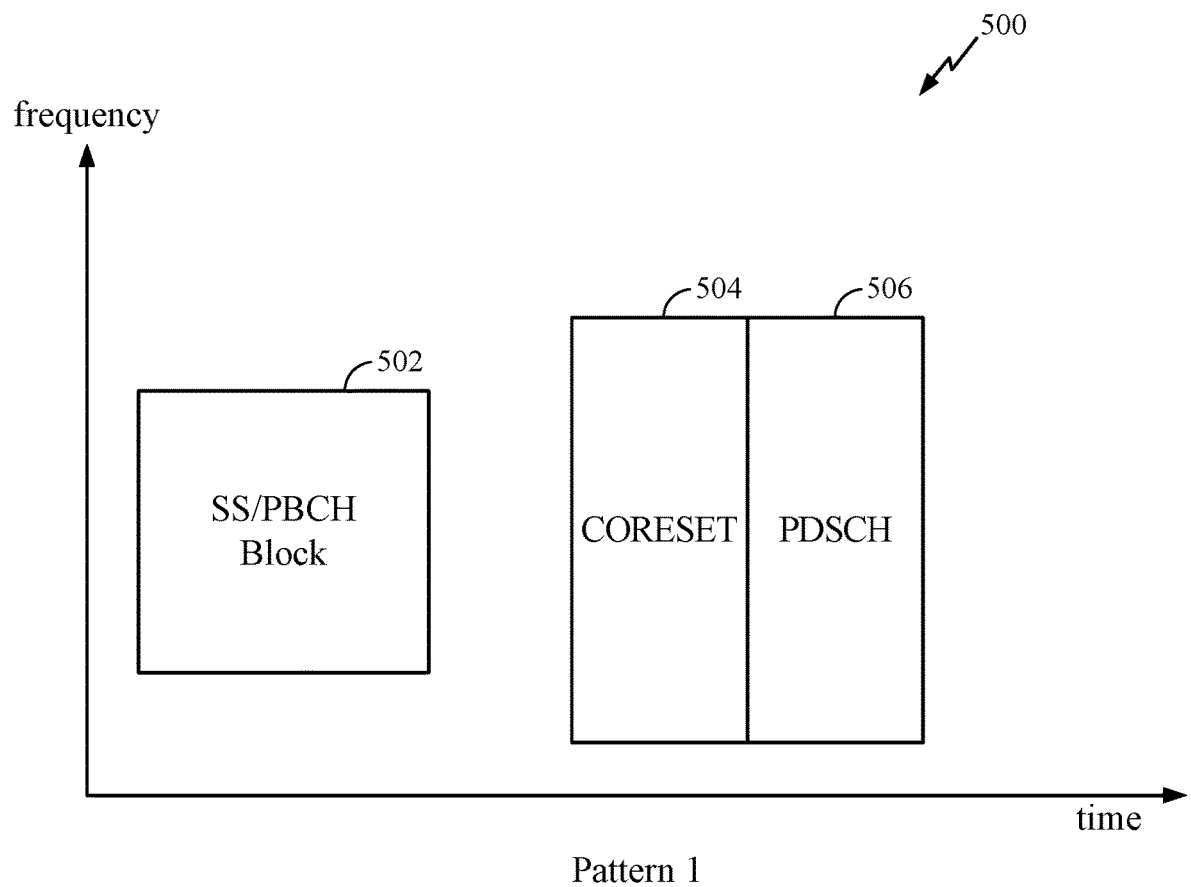
FIG. 5 shows an exemplary transmission resource mapping, according to aspects of the present disclosure.

FIG. 5 shows an exemplary transmission resource mapping 500, according to aspects of the present disclosure. In the exemplary mapping, a BS (e.g., BS 110a, shown in FIG. 1) transmits an SS/PBCH block 502. The SS/PBCH block includes a MIB conveying an index to a table that relates the time and frequency resources of the CORESET 504 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 506. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

Example Mitigation of Timing Resolution
Limitation Due to SSB with Smaller SCS

Aspects of the present disclosure relate to wireless communications, and more particularly, to techniques for mitigating timing resolution limitation due to synchronization signal blocks (SSB) with smaller subcarrier spacing (SCS). For example, the techniques may help align control resource sets (CORESETs) with symbols that have larger cyclic prefixes (CP) durations, allowing a UE to refine timing adjustment after detecting an SSB.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 µs, while in FR4 with 960 kHz, the slot length is 15.6 µs. In some cases, a frequency band referred to as FR2x may be used.

In FR2x, it may be desirable to reuse the FR2 SSB (120 kHz SCS) design, as illustrated in FIG. 6A, which has better link budget and requires much lower searcher complexity. A larger SCS may be required to accommodate higher phase noise associated with FR2x frequency band. Other physical channels (other than SSB) may use larger SCS (960 kHz, 1.92 MHz, 3.84 MHz), as illustrated in FIG. 6B.

Unfortunately, the larger SCS impacts the timing resolution of SSB which, in some cases, may not be sufficient for CORESET 0 (initial CORESET #0) reception. Timing uncertainty may be comparable, and in some cases larger, than the timing uncertainty due to shorter CP length associated with larger SCS, which may make it difficult to determine the CORESET 0 symbol boundary.

Accordingly, certain aspects of the present disclosure provide techniques for mitigating the lower timing resolution associated with 120 kHz SCS by taking advantage of the longer CP in certain symbols. If longer CP symbols are not available, the only solution may be to apply multiple timing hypotheses when determining symbol boundary For example, as illustrated in FIGS. 7A-7C, in the FR2x waveform design, the first few OFDM symbols of every 0.5 ms (half subframe) may have a significantly longer CP than the other OFDM symbols. The longer CP of these first few symbols at every half-SF may allow some extra margin for timing ambiguity in detecting symbol boundary. Further, if these first few symbols contain RS (reference symbols), they can be used to refine timing estimate for the signal with larger SCS.

Figure 8:
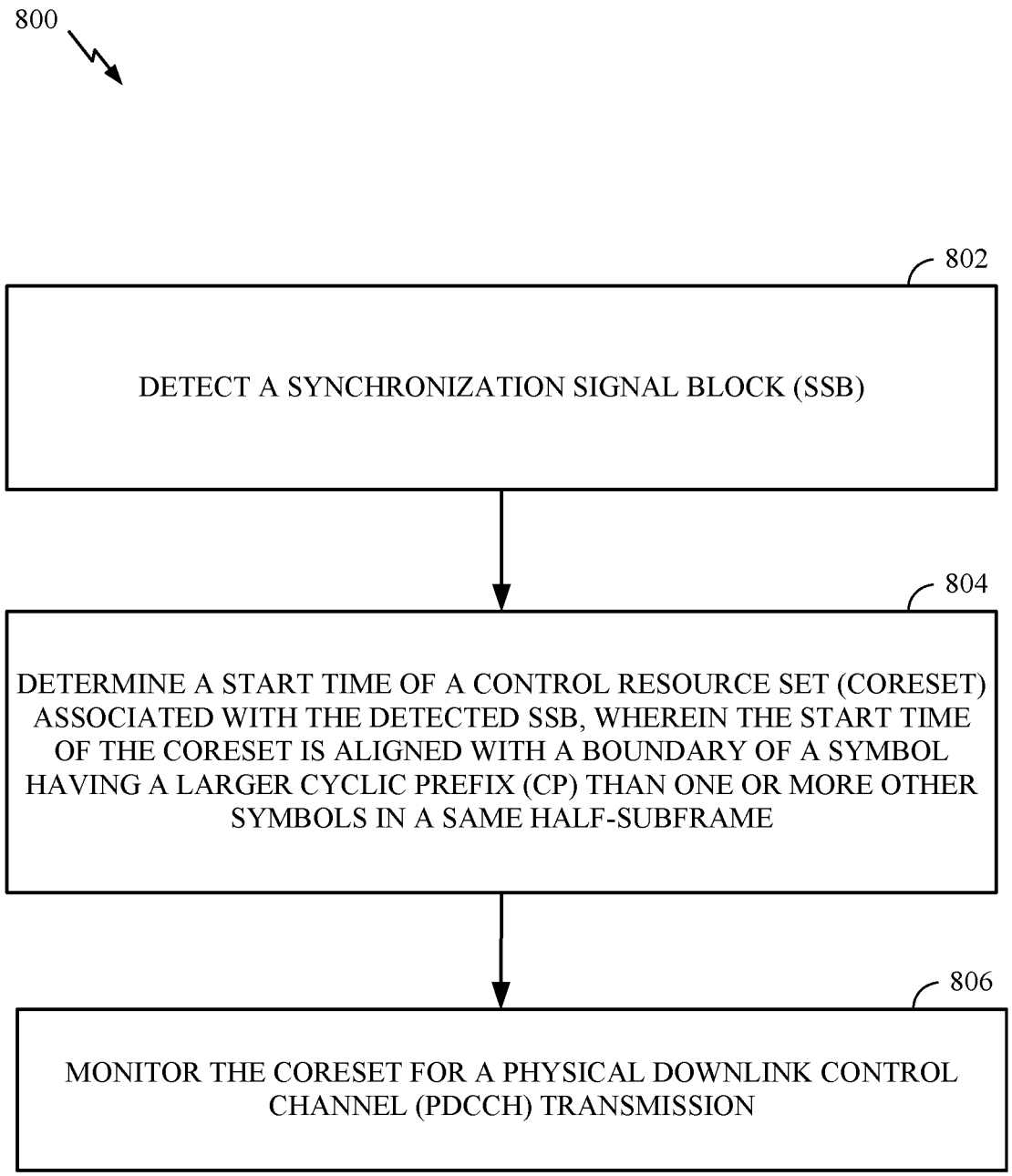
FIG. 8 illustrates example operations for wireless communications by a user equipment (UE), in accordance with certain aspects of the present disclosure.
Figure 9:
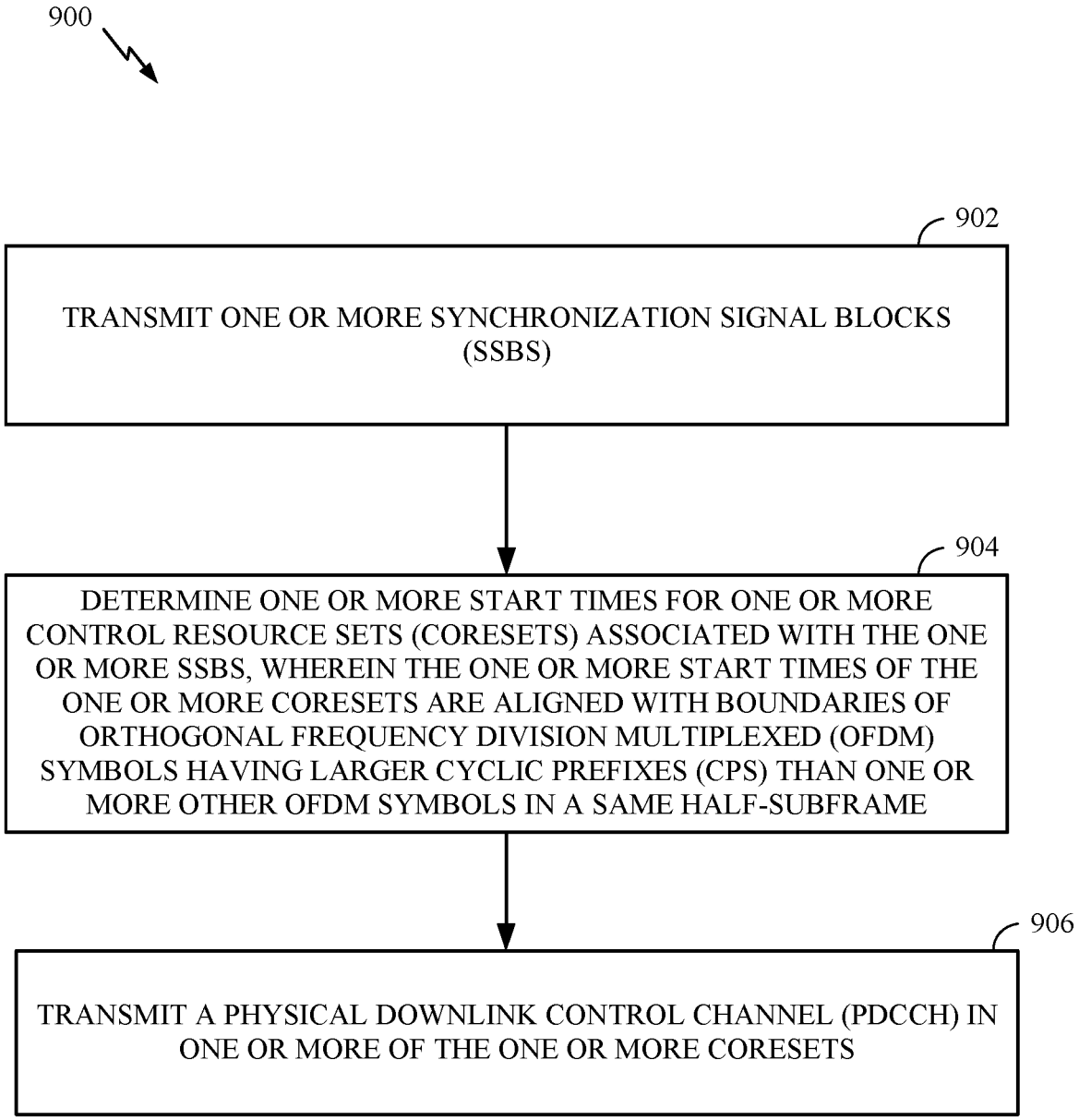
FIG. 9 illustrates example operations for wireless communications by a network entity, in accordance with certain aspects of the present disclosure.

FIGS. 8 and 9 illustrate example operations that may be performed by a UE and network entity, respectively, for mitigating timing resolution limitations due to SSBs with low SCSs, in accordance with aspects of the present disclosure.

FIG. 8 illustrates example operations 800 for wireless communications by a UE, in accordance with certain aspects of the present disclosure. For example, operations 800 may be performed by a UE 120 of FIG. 1 to mitigate timing resolution limitations when detecting a CORESET (e.g., CORESET 0) boundary.

Operations 800 begin, at 802, by detecting a synchronization signal block (SSB). At 804, the UE determines a start time of a CORESET associated with the detected SSB, where the start time of the CORESET is aligned with a boundary of a symbol having a larger CP than one or more other symbols in a same half-subframe. At 806, the UE monitors the CORESET for a physical downlink control channel (PDCCH) transmission.

FIG. 9 illustrates example operations 900 for wireless communications by a network entity and may be considered complementary to operations 900 of FIG. 9. For example, operations 900 may be performed by a gNB to send a PDCCH in a CORESET aligned with a symbol boundary, to a UE performing operations 800.

Operations 900 begin, at 902, by transmitting one or more synchronization signal blocks (SSBs). At 904, the network entity determines one or more start times for one or more CORESETs associated with the one or more SSBs, wherein the one or more start times of the one or more CORESETs are aligned with boundaries of orthogonal frequency division multiplexed (OFDM) symbols having larger CPs than one or more other OFDM symbols in a same half-subframe. At 906, the network entity transmits a PDCCH in one or more of the one or more CORESETs.

According to one approach, the start time of the CORESET (e.g., CORESET 0) to be aligned with the beginning of a half-subframe (0.5 ms) boundary. In this manner, CORESET 0 symbols may have a longer CP that can be used to handle the timing ambiguity due to limited SSB timing resolution. In some cases, the DMRS of a PDCCH (sent in CORESET 0) can be used by the UE to refine symbol timing estimate.

There may still be some limitations to this approach. For example, due to this limitation, the periodicity of CORESET 0 may not be smaller than (0.5 ms×N beams). In case of a 64 beam configuration, this would mean the periodicity is at least 32 ms.

Figure 10:
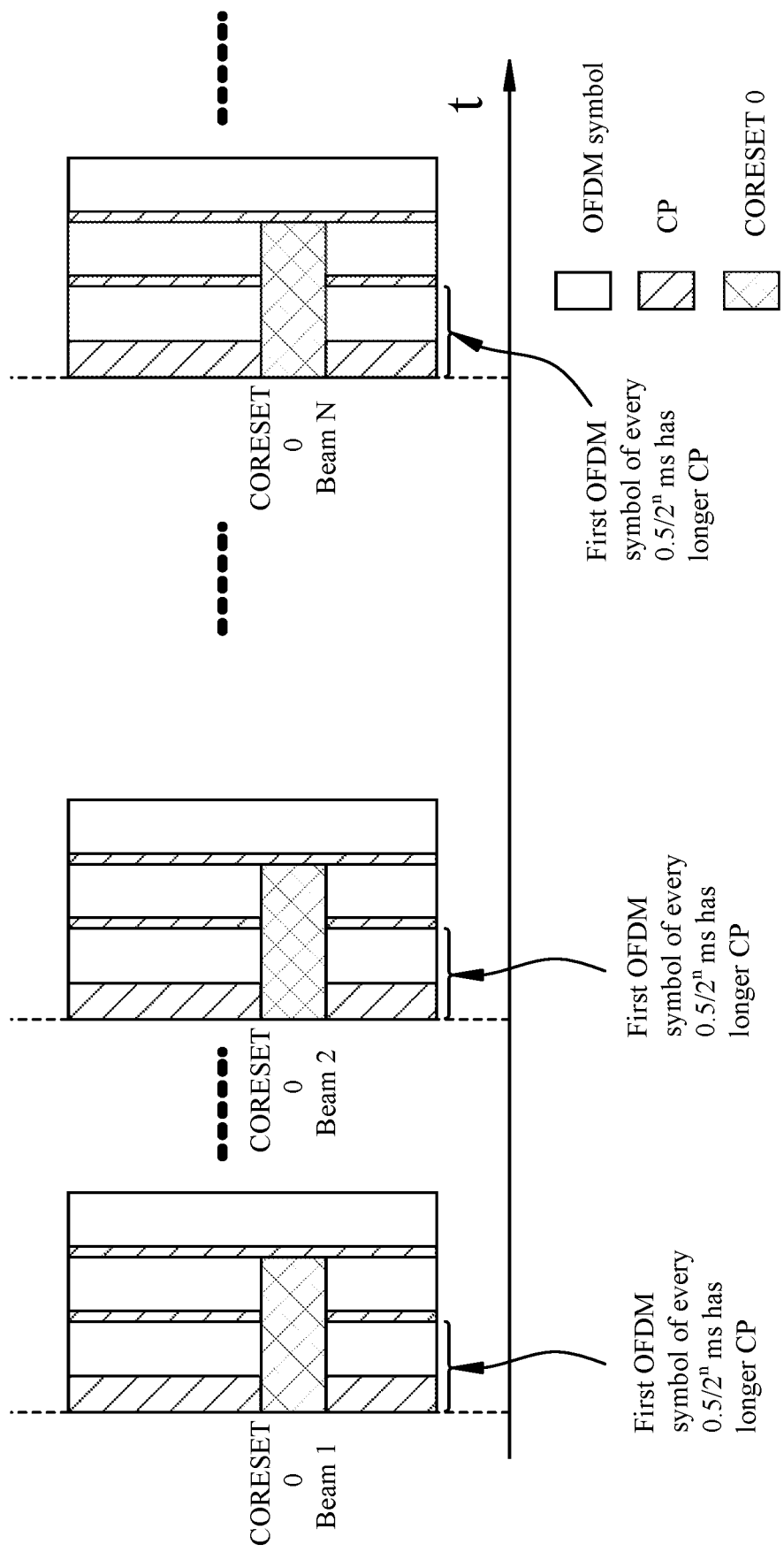
FIG. 10 illustrates example alignment of control resource sets with extended cyclic prefix symbols, in accordance with certain aspects of the present disclosure.

According to another approach, excess CP duration may be distributed among first few symbols of certain time windows occurring periodically. For example, as illustrated in FIG. 10, for excess the excess CP duration may be spread among the first OFDM symbol of time windows occurring every $0.5/2^n$ ms.

This approach may help reduce the CORESET 0 periodicity, allowing the CORESET 0 periodicity to be $(0.5/2^n \times N_{beams})$. As an example, when n=2, the periodicity can be reduced (from the 32 ms example above) to 8 ms (e.g., within a single radio frame). This may mean, however, that the symbol-level alignment between larger SCSs (e.g., 960 kHz and above) for FR2x waveforms and smaller SCS (e.g., 120 kHz) for FR2 waveforms may not be maintained. Nevertheless, the reduction in CORESET0 flexibility may be worth the tradeoff.

As proposed herein, aligning the start of a CORESET with symbols having a longer CP may help a UE handle the timing ambiguity that might be created due to limited SSB timing resolution.

Example Communications Devices

Figure 11:
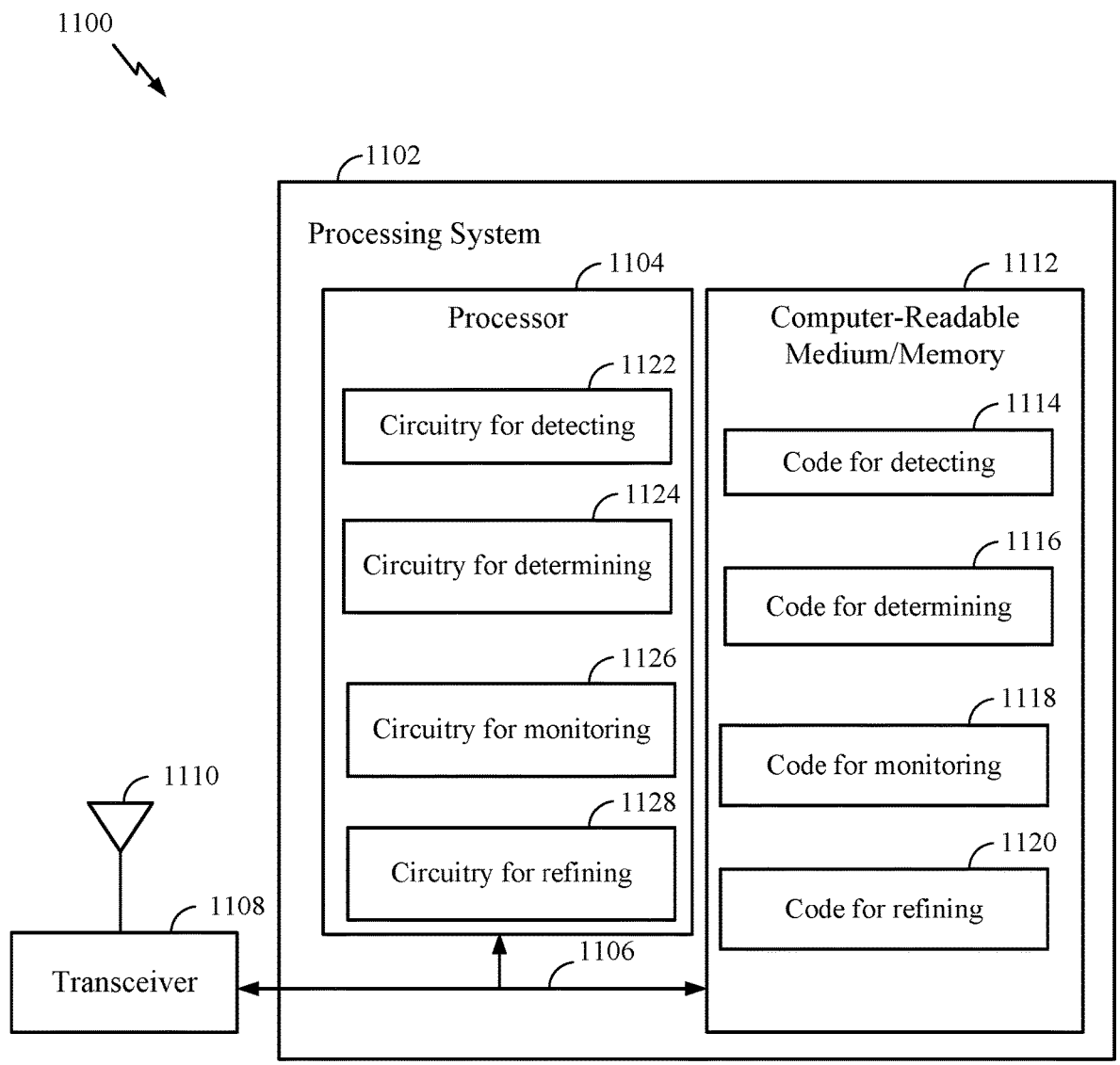
FIGS. 11-12 illustrate example communications devices that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein. In certain aspects, computer-readable medium/memory 1112 stores code 1114 for detecting; code 1116 for determining; code 1118 for monitoring; and code 1120 for refining.

In certain aspects, the code 1114 for detecting includes code for detecting a synchronization signal block (SSB).

In certain aspects, the code 1116 for determining includes code for determining a start time of a control resource set (CORESET) associated with the detected SSB, wherein the start time of the CORESET is aligned with a boundary of a symbol having a larger cyclic prefix (CP) than one or more other symbols in a same half-subframe.

In certain aspects, the code 1118 for monitoring includes code for monitoring the CORESET for a physical downlink control channel (PDCCH) transmission.

In certain aspects, the code 1120 for refining includes code for refining a symbol timing estimate based on a demodulation reference signal (DMRS) transmitted with the PDCCH.

In certain aspects, the processor 1104 has circuitry configured to implement the code stored in the computer-readable medium/memory 1112. The processor 1104 includes circuitry 1122 for detecting; circuitry 1124 for determining; circuitry 1126 for monitoring; and circuitry 1128 for refining.

In certain aspects, the circuitry 1122 for detecting includes circuitry for detecting a SSB.

In certain aspects, the circuitry 1124 for determining includes circuitry for determining a start time of a CORESET associated with the detected SSB, wherein the start time of the CORESET is aligned with a boundary of a symbol having a larger CP than one or more other symbols in a same half-subframe.

In certain aspects, the circuitry 1126 for monitoring includes circuitry for monitoring the CORESET for a PDCCH transmission.

In certain aspects, the circuitry 1128 for refining includes code for refining a symbol timing estimate based on a DMRS transmitted with the PDCCH.

Figure 12:
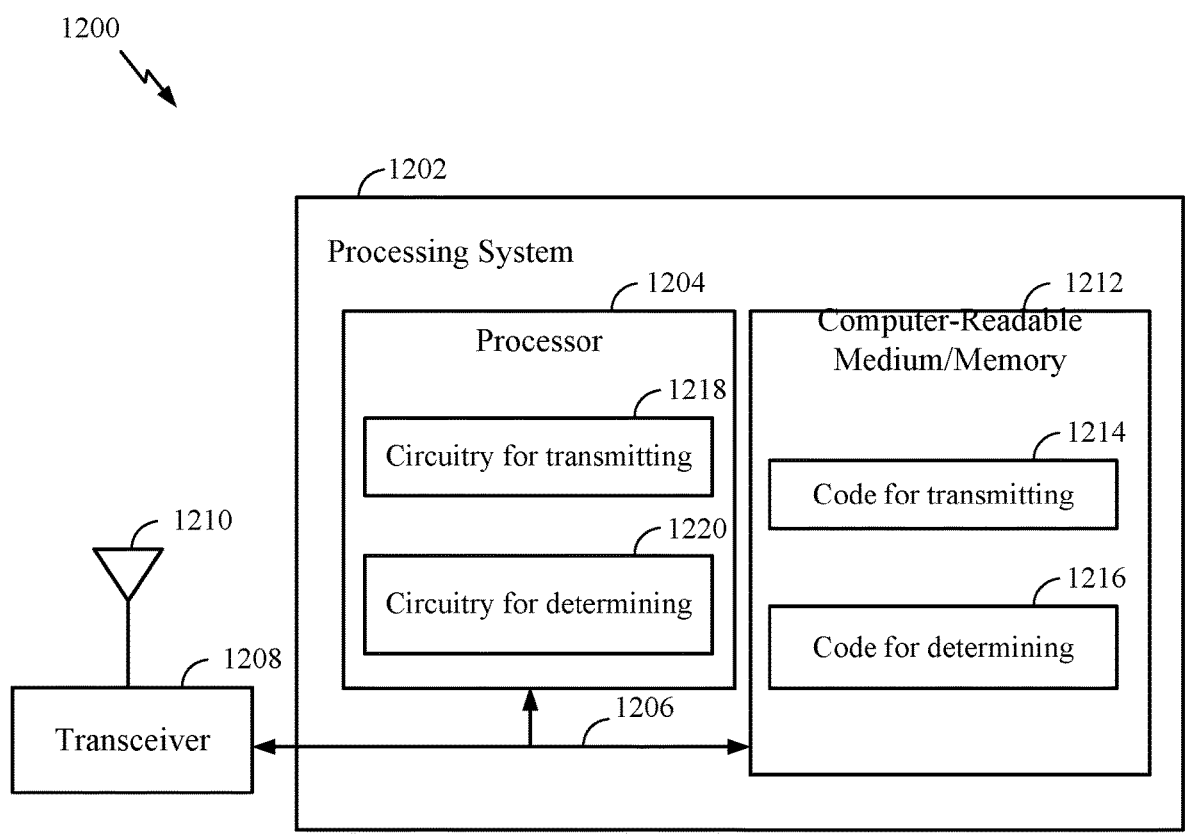

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein. In certain aspects, computer-readable medium/memory 1212 stores: code 1214 for transmitting; and code 1216 for determining.

In certain aspects, the code 1214 for transmitting includes code for transmitting one or more SSBs; and code for transmitting a PDCCH in one or more of the one or more CORESETs.

In certain aspects, the code 1216 for determining includes code for determining one or more start times for one or more CORESETs associated with the one or more SSBs, wherein the one or more start times of the one or more CORESETs are aligned with boundaries of orthogonal frequency division multiplexed (OFDM) symbols having larger CPs than one or more other OFDM symbols in a same half-subframe.

In certain aspects, the processor 1204 has circuitry configured to implement the code stored in the computer-readable medium/memory 1212. The processor 1204 includes circuitry 1218 for transmitting; and circuitry 1220 for determining.

In certain aspects, the circuitry 1218 for transmitting includes circuitry for transmitting one or more SSBs; and code for transmitting a PDCCH in one or more of the one or more CORESETs.

In certain aspects, the circuitry 1220 for determining includes circuitry for determining one or more start times for one or more CORESETs associated with the one or more SSBs, wherein the one or more start times of the one or more CORESETs are aligned with boundaries of OFDM symbols having larger CPs than one or more other OFDM symbols in a same half-subframe.

Example Aspects

Aspect 1: A method for wireless communication by a user-equipment (UE), including detecting a synchronization signal block (SSB); determining a start time of a control resource set (CORESET) associated with the detected SSB, wherein the start time of the CORESET is aligned with a boundary of a symbol having a larger cyclic prefix (CP) than one or more other symbols in a same half-subframe; and monitoring the CORESET for a physical downlink control channel (PDCCH) transmission.

Aspect 2: The method of Aspect 1, further including refining a symbol timing estimate based on a demodulation reference signal (DMRS) transmitted with the PDCCH.

Aspect 3: The method of Aspect 1 or 2, where the SSB has a first subcarrier spacing (SCS); and the CORESET has a second SCS.

Aspect 4: The method of Aspect 3, where a size of the larger CP is determined based, at least in part, on the SCS of the CORESET.

Aspect 5: The method of any of Aspects 1-4, where the start time of the CORESET is aligned with a beginning of a half-subframe boundary.

Aspect 6: The method of any of Aspects 1-5, where symbols having larger CPs are distributed among a time window that spans a number of symbols and occurs with a periodicity.

Aspect 7: The method of Aspect 6, where the periodicity of the CORESET associated with the detected SSB relates to the periodicity of the time window and number of beams used to transmit SSBs.

Aspect 8: The method of Aspect 6 or 7, where a start time of the CORESET is aligned with a symbol other than a symbol at a beginning of a half-subframe boundary.

Aspect 9: A method for wireless communication by a network entity, including transmitting one or more SSBs; determining one or more start times for one or more CORESETs associated with the one or more SSBs, wherein the one or more start times of the one or more CORESETs are aligned with boundaries of orthogonal frequency division multiplexed (OFDM) symbols having larger CPs than one or more other OFDM symbols in a same half-subframe; and transmitting a PDCCH in one or more of the one or more CORESETs.

Aspect 10: The method of Aspect 9, where the one or more SSBs have a first SCS; and the one or more CORESETs have a second SCS.

Aspect 11: The method of Aspect 10, where a size of the larger CP is determined based, at least in part, on the SCS of the one or more CORESETs.

Aspect 12: The method of any of Aspects 9-11, where a start time of the one or more CORESETs is aligned with a beginning of a half-subframe boundary.

Aspect 13: The method of any of Aspects 9-12, where symbols having larger CPs are distributed among a time window that spans a number of symbols and occurs with a periodicity.

Aspect 14: The method of Aspect 13, where the periodicity of the one or more CORESETs associated with the one or more SSBs relates to the periodicity of the time window and number of beams used to transmit SSBs.

Aspect 15: The method of Aspect 13 or 14, where a start time of the one or more CORESETs is aligned with a symbol other than a symbol at a beginning of a half-subframe boundary.

Aspect 16: An apparatus for wireless communication by a UE, comprising a memory and at least one processor coupled to the memory, the memory and the at least one processor being configured to perform any of the operations of Aspects 1-15.

Aspect 17: An apparatus for wireless communication by a UE, comprising means for performing any of the operations of Aspects 1-15.

Aspect 18: A computer readable medium having instructions stored thereon for performing any of the operations of Aspects 1-15.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, processors controller/processor 280 of the UE 120 120 may be configured to perform operations 800 of FIG. 8, while controller/processor 240 of the B S 110 shown in FIG. 2 may be configured to perform operations 900 of FIG. 9.

Means for receiving may include a receiver (such as one or more antennas or receive processors) illustrated in FIG. 2. Means for transmitting may include a transmitter (such as one or more antennas or transmit processors) illustrated in FIG. 2. Means for determining, means for processing, means for treating, and means for applying may include a processing system, which may include one or more processors of the UE 120 and/or one or more processors of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user-equipment (UE), comprising:
    detecting a synchronization signal block (SSB);
    determining a start time of a control resource set (CORESET) associated with the detected SSB, wherein the start time of the CORESET is aligned with a boundary of a symbol having a larger cyclic prefix (CP) than one or more other symbols in a same half-subframe, wherein a size of the larger CP is determined based, at least in part, on a subcarrier spacing (SCS) of the CORESET, and wherein a periodicity of the CORESET is based on a number of beams used to transmit SSBs; and
    monitoring the CORESET for a physical downlink control channel (PDCCH) transmission.

2. The method of claim 1, further comprising refining a symbol timing estimate based on a demodulation reference signal (DMRS) transmitted with the PDCCH.

3. The method of claim 1, wherein:
    the SSB has a first SCS; and
    the CORESET has a second SCS.

4. The method of claim 1, wherein the start time of the CORESET is aligned with a beginning of a half-subframe boundary.

5. The method of claim 1, wherein symbols having larger CPs are distributed among a time window that spans a number of symbols and occurs with a periodicity.

6. The method of claim 5, wherein the periodicity of the CORESET associated with the detected SSB is further based on the periodicity of the time window.

7. The method of claim 5, wherein a start time of the CORESET is aligned with a symbol other than a symbol at a beginning of a half-subframe boundary.

8. A method for wireless communication by a network entity, comprising:
   transmitting one or more synchronization signal blocks (SSBs);
   determining one or more start times for one or more control resource sets (CORESETs) associated with the one or more SSBs, wherein the one or more start times of the one or more CORESETs are aligned with boundaries of orthogonal frequency division multiplexed (OFDM) symbols having larger cyclic prefixes (CPs) than one or more other OFDM symbols in a same half-subframe, wherein a size of the larger CP is determined based, at least in part, on a subcarrier spacing (SCS) of the one or more CORESETs; and
   transmitting a physical downlink control channel (PDCCH) in one or more of the one or more CORESETs.

9. A method for wireless communication by a network entity, comprising:
   transmitting one or more synchronization signal blocks (SSBs);
   determining one or more start times for one or more control resource sets (CORESETs) associated with the one or more SSBs, wherein the one or more start times of the one or more CORESETs are aligned with boundaries of orthogonal frequency division multiplexed (OFDM) symbols having larger cyclic prefixes (CPs) than one or more other OFDM symbols in a same half-subframe, wherein a size of the larger CP is determined based, at least in part, on a subcarrier spacing (SCS) of the one or more CORESETs, and wherein a periodicity of the CORESET is based on a number of beams used to transmit SSBs; and
   transmitting a physical downlink control channel (PDCCH) in one or more of the one or more CORESETs.

10. The method of claim 8, wherein a start time of the one or more CORESETs is aligned with a beginning of a half-subframe boundary.

11. The method of claim 8, wherein symbols having larger CPs are distributed among a time window that spans a number of symbols and occurs with a periodicity.

12. The method of claim 11, wherein the periodicity of the one or more CORESETs associated with the one or more SSBs relates to the periodicity of the time window and number of beams used to transmit one or more SSBs.

13. The method of claim 11, wherein a start time of the one or more CORESETs is aligned with a symbol other than a symbol at a beginning of a half-subframe boundary.

14. The method of claim 12, wherein the periodicity of the one or more CORESETs associated with the one or more SSBs are further based on the periodicity of the time window.

15. The apparatus of claim 12, wherein a start time of the one or more CORESETs is aligned with a symbol other than a symbol at a beginning of a half-subframe boundary.

16. An apparatus for wireless communication by a user-equipment (UE), comprising:
   at least one processor and a memory configured to
      detect a synchronization signal block (SSB);
      determine a start time of a control resource set (CORESET) associated with the detected SSB, wherein the start time of the CORESET is aligned with a boundary of a symbol having a larger cyclic prefix (CP) than one or more other symbols in a same half-subframe, wherein a size of the larger CP is determined based, at least in part, on a subcarrier spacing (SCS) of the one or more CORESETs, and wherein a periodicity of the CORESET is based on a number of beams used to transmit SSBs; and
      monitor the CORESET for a physical downlink control channel (PDCCH) transmission.

17. The apparatus of claim 16, wherein the at least one processor and the memory are further configured to refine a symbol timing estimate based on a demodulation reference signal (DMRS) transmitted with the PDCCH.

18. The apparatus of claim 16, wherein:
   the SSB has a first SCS; and
   the CORESET has a second SCS.

19. The apparatus of claim 16, wherein the start time of the CORESET is aligned with a beginning of a half-subframe boundary.

20. The apparatus of claim 16, wherein symbols having larger CPs are distributed among a time window that spans a number of symbols and occurs with a periodicity.

21. The apparatus of claim 20, wherein the periodicity of the CORESET associated with the detected SSB is further based on the periodicity of the time window.

22. The apparatus of claim 20, wherein a start time of the CORESET is aligned with a symbol other than a symbol at a beginning of a half-subframe boundary.

23. The apparatus of claim 20, wherein the periodicity of the CORESET is not smaller than the periodicity of the time window multiplied by the number of beams used to transmit SSBs.

24. An apparatus for wireless communication by a network entity, comprising:
   at least one processor and a memory configured to
      transmit one or more synchronization signal blocks (SSBs);
      determine start times for one or more control resource sets (CORESETs) associated with the one or more SSBs, wherein the one or more start times of the one or more CORESETs are aligned with boundaries of orthogonal frequency division multiplexed (OFDM) symbols having larger cyclic prefixes (CPs) than one or more other OFDM symbols in a same half-subframe, wherein a size of the larger CP is determined based, at least in part, on a subcarrier spacing (SCS) of the one or more CORESETs, and wherein a periodicity of the CORESET is based on a number of beams used to transmit SSBs; and
      transmit a physical downlink control channel (PDCCH) in one or more of the one or more CORESETs.

25. The apparatus of claim 24, wherein:
   the one or more SSBs have a first SCS; and
   the one or more CORESETs have a second SCS.

26. The apparatus of claim 24, wherein a start time of the one or more CORESETs is aligned with a beginning of a half-subframe boundary.

27. The apparatus of claim 24, wherein symbols having larger CPs are distributed among a time window that spans a number of symbols and occurs with a periodicity.

28. The apparatus of claim 27, wherein the periodicity of the one or more CORESETs associated with the one or more SSBs are further based on the periodicity of the time window.

29. The apparatus of claim 27, wherein a start time of the one or more CORESETs is aligned with a symbol other than a symbol at a beginning of a half-subframe boundary.

30. The apparatus of claim 27, wherein the periodicity of the CORESET is not smaller than the periodicity of the time window multiplied by the number of beams used to transmit SSBs.

* * * * *